(12) United States Patent
Fukushi et al.

(10) Patent No.: US 11,953,509 B2
(45) Date of Patent: Apr. 9, 2024

(54) AUTOMATIC ANALYZER

(71) Applicant: Hitachi High-Tech Corporation, Tokyo (JP)

(72) Inventors: Yudai Fukushi, Tokyo (JP); Ryosuke Funahashi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 603 days.

(21) Appl. No.: 17/276,832

(22) PCT Filed: Jan. 20, 2020

(86) PCT No.: PCT/JP2020/001658
§ 371 (c)(1),
(2) Date: Mar. 17, 2021

(87) PCT Pub. No.: WO2020/179246
PCT Pub. Date: Sep. 10, 2020

(65) Prior Publication Data
US 2021/0263058 A1 Aug. 26, 2021

(30) Foreign Application Priority Data

Mar. 1, 2019 (JP) .................................. 2019-037344

(51) Int. Cl.
*G01N 35/00* (2006.01)
*G01N 35/02* (2006.01)
*G01N 35/04* (2006.01)

(52) U.S. Cl.
CPC ..... *G01N 35/00732* (2013.01); *G01N 35/025* (2013.01); *G01N 35/04* (2013.01);
(Continued)

(58) Field of Classification Search
CPC .......... G01N 2035/00435; G01N 2035/00445; G01N 2035/00811; G01N 2035/0412;
(Continued)

(56) References Cited

U.S. PATENT DOCUMENTS

2011/0223064 A1\* 9/2011 Katsumi ............ G01N 35/1002
422/68.1
2011/0236981 A1 9/2011 Wakamiya et al.
(Continued)

FOREIGN PATENT DOCUMENTS

CN 107407689 A 11/2017
JP 2009210444 A \* 9/2009
(Continued)

OTHER PUBLICATIONS

Keiko (JP 2009-210444 A) Published 2009, translated 2023 (Year: 2009).\*
(Continued)

*Primary Examiner* — Jennifer Wecker
*Assistant Examiner* — Jonathan Bortoli
(74) *Attorney, Agent, or Firm* — MATTINGLY & MALUR, PC

(57) ABSTRACT

The automatic analyzer includes a housing unit capable of housing a plurality of reagent bottles each of which has an IC tag on one surface of short-side side surfaces thereof, an antenna used to communicate with the IC tag, a detector that detects the presence or absence of a reagent bottles, and a control unit. The housing unit includes a housing container cooled by a cooling machine, a heat insulating material, a reagent tray provided with a plurality of reagent bottle holding portions that hold the reagent bottles, a disk rotatably holding the reagent tray, and a driving unit driving the disk, and when it is unable to communicate with the IC tag of the reagent bottle installed in the reagent bottle holding
(Continued)

portion where the reagent bottle is detected by the detector, the control unit determines that the reagent bottle is installed in a reverse direction.

6 Claims, 10 Drawing Sheets

(52) U.S. Cl.
CPC .............. *G01N 2035/00445* (2013.01); *G01N 2035/00811* (2013.01); *G01N 2035/0441* (2013.01); *G01N 2035/0443* (2013.01)

(58) Field of Classification Search
CPC ... G01N 2035/0441; G01N 2035/0443; G01N 2035/0494; G01N 35/00732; G01N 35/025; G01N 35/04; G01N 21/00
See application file for complete search history.

(56) References Cited

U.S. PATENT DOCUMENTS

| 2012/0128534 A1 | 5/2012 | Minemura et al. |
| 2018/0267068 A1 | 9/2018 | Mori et al. |

FOREIGN PATENT DOCUMENTS

| JP | 2011-027658 A | 2/2011 |
| JP | 2011-203114 A | 10/2011 |
| JP | 2013-134145 A | 7/2013 |

OTHER PUBLICATIONS

Chinese Office Action received in corresponding Chinese Application No. 202080005542.1 dated Apr. 27, 2023.
International Search Report of PCT/JP2020/001658 dated Mar. 24, 2020.

* cited by examiner

[FIG. 1]
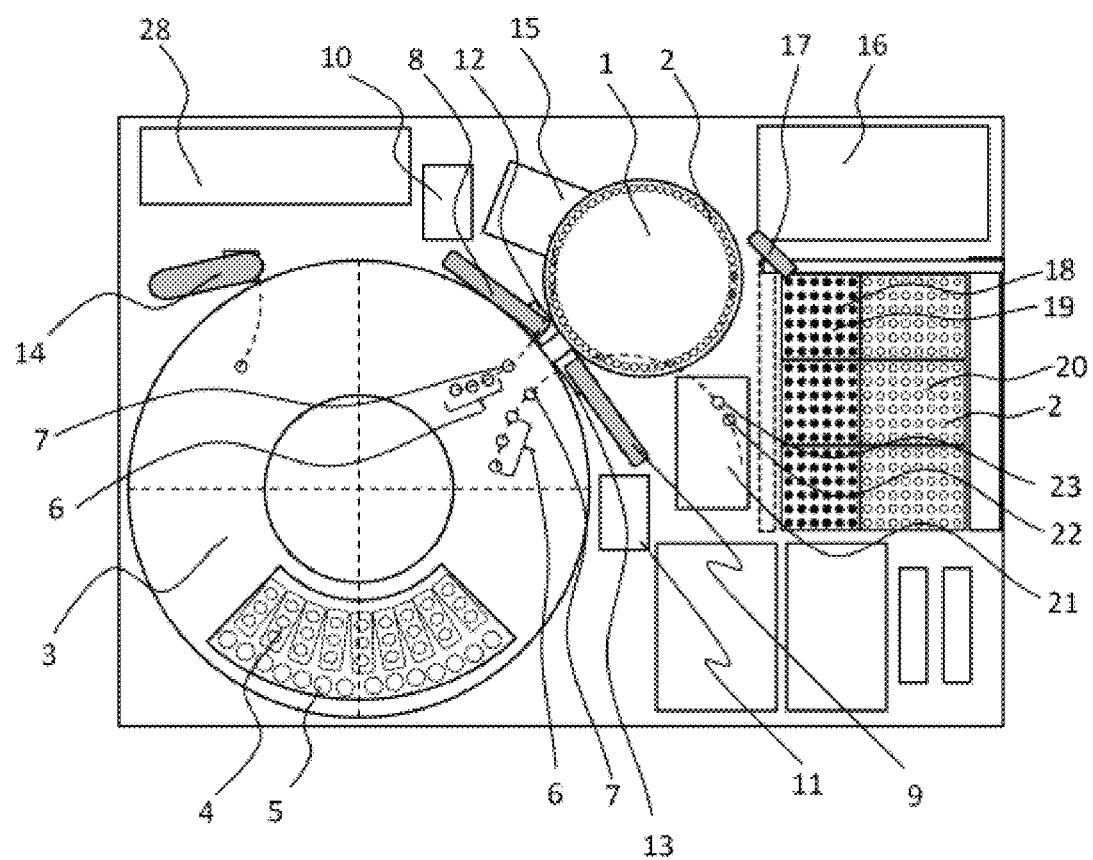

[FIG. 2]
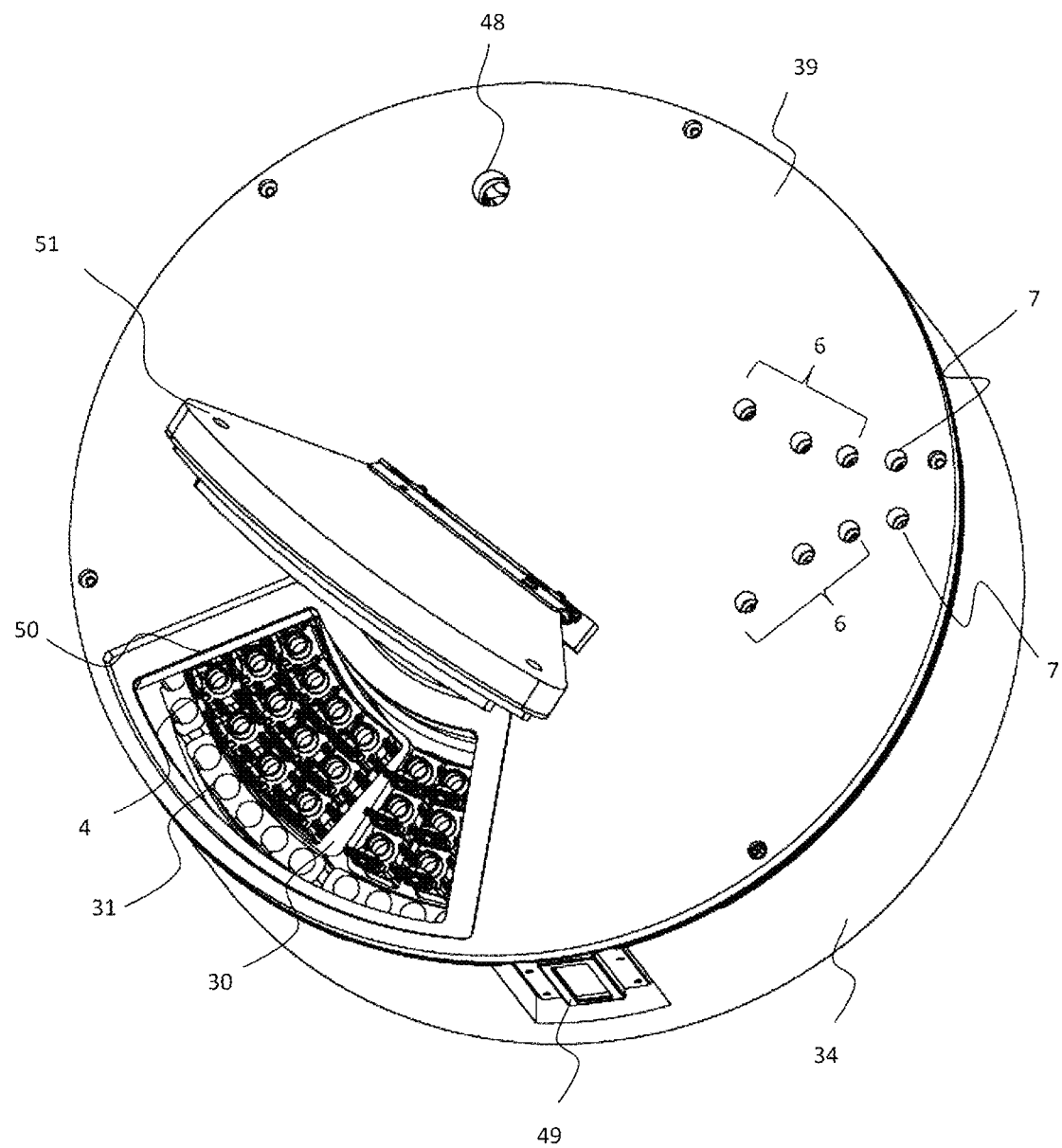

[FIG. 3]
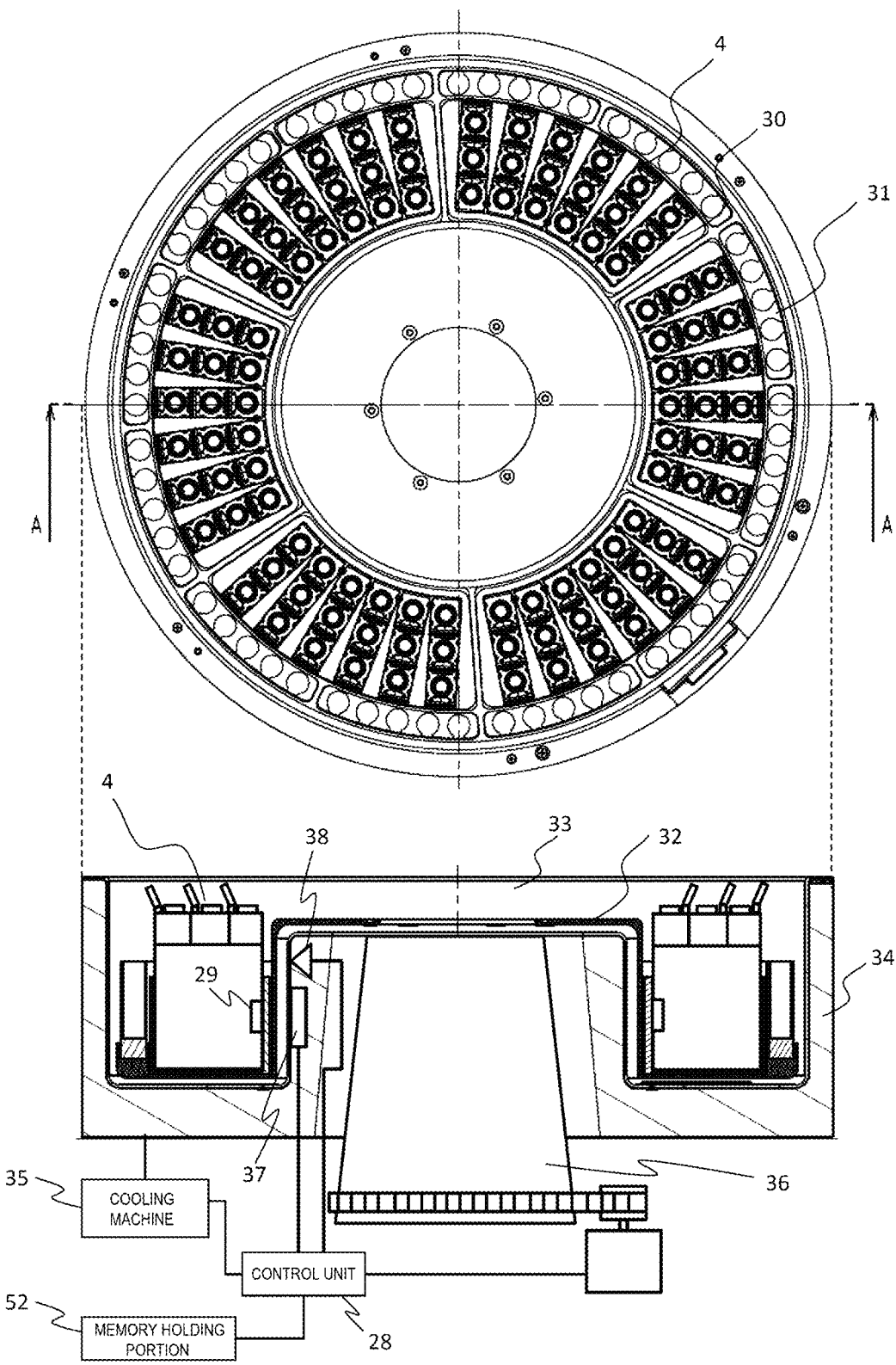

[FIG. 4]
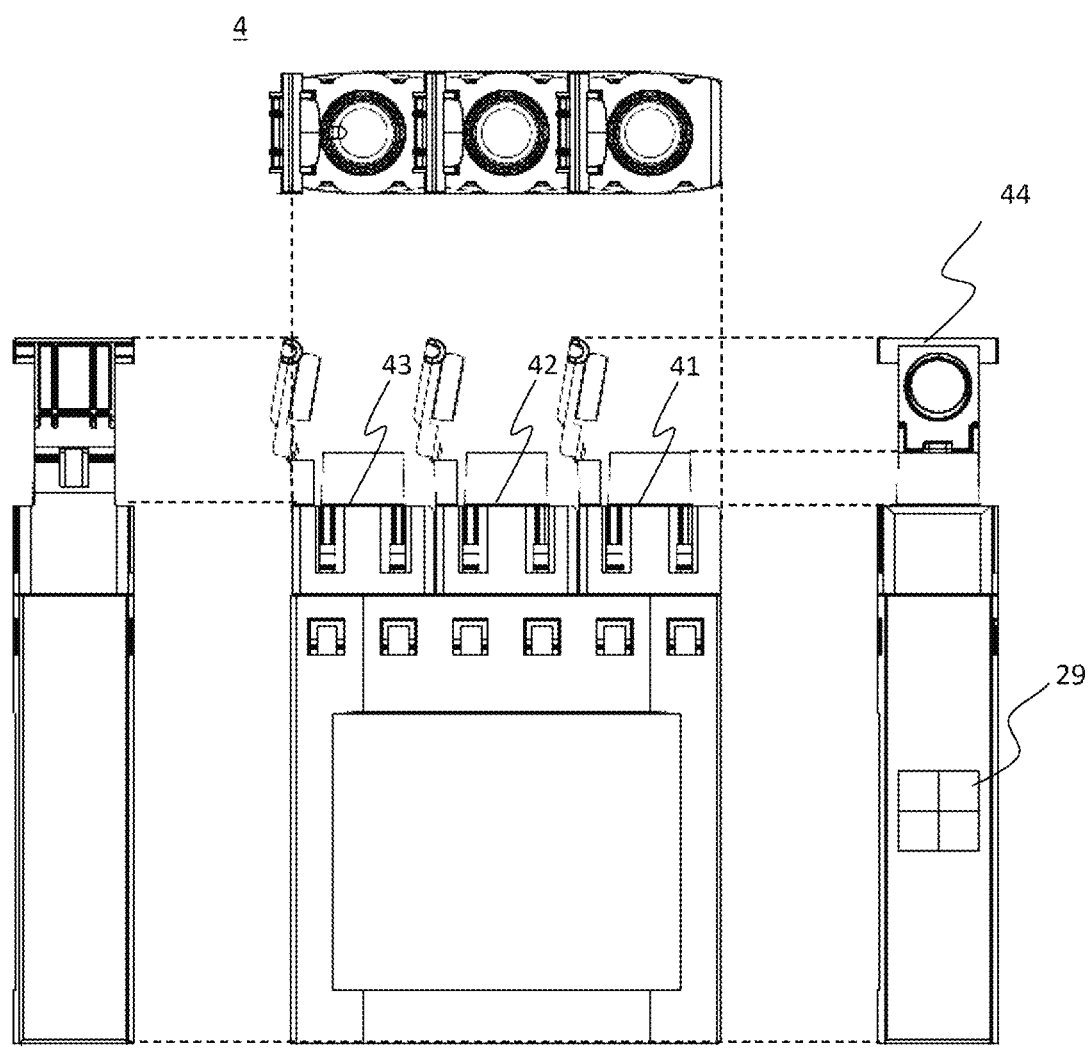

[FIG. 5A]
30
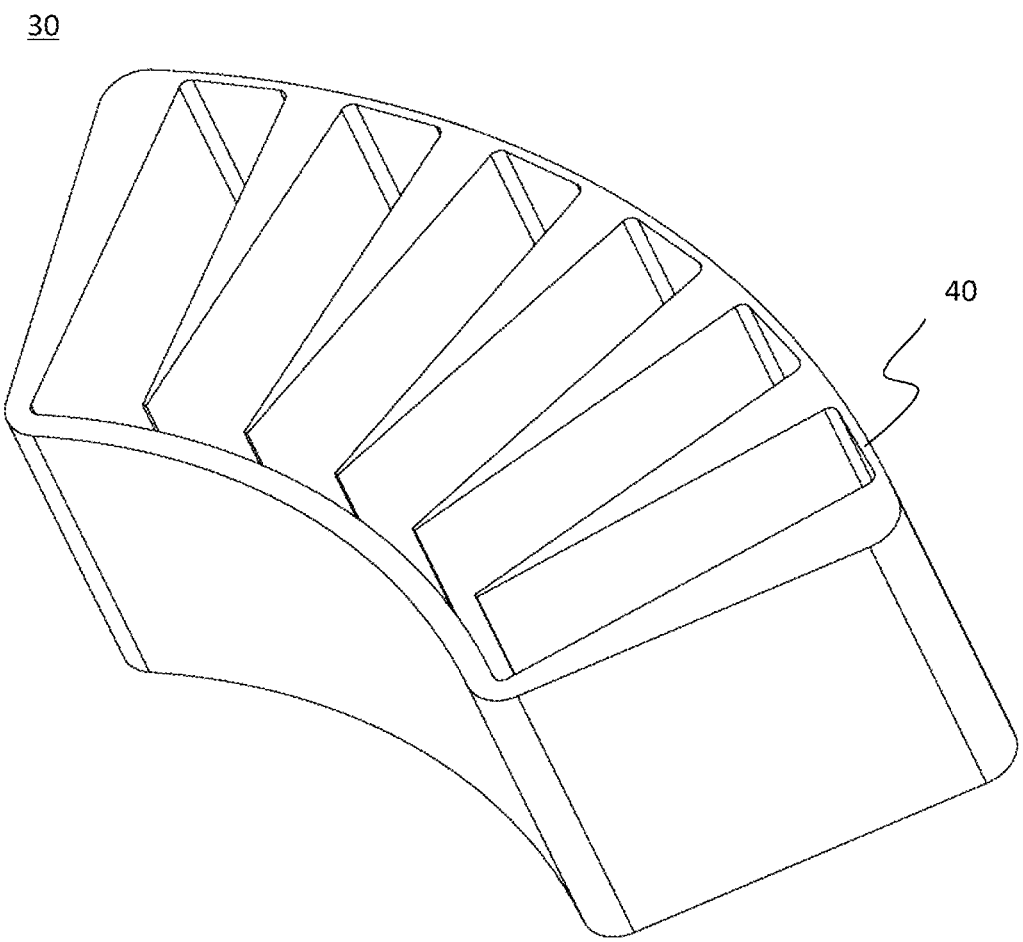
40

[FIG. 5B]
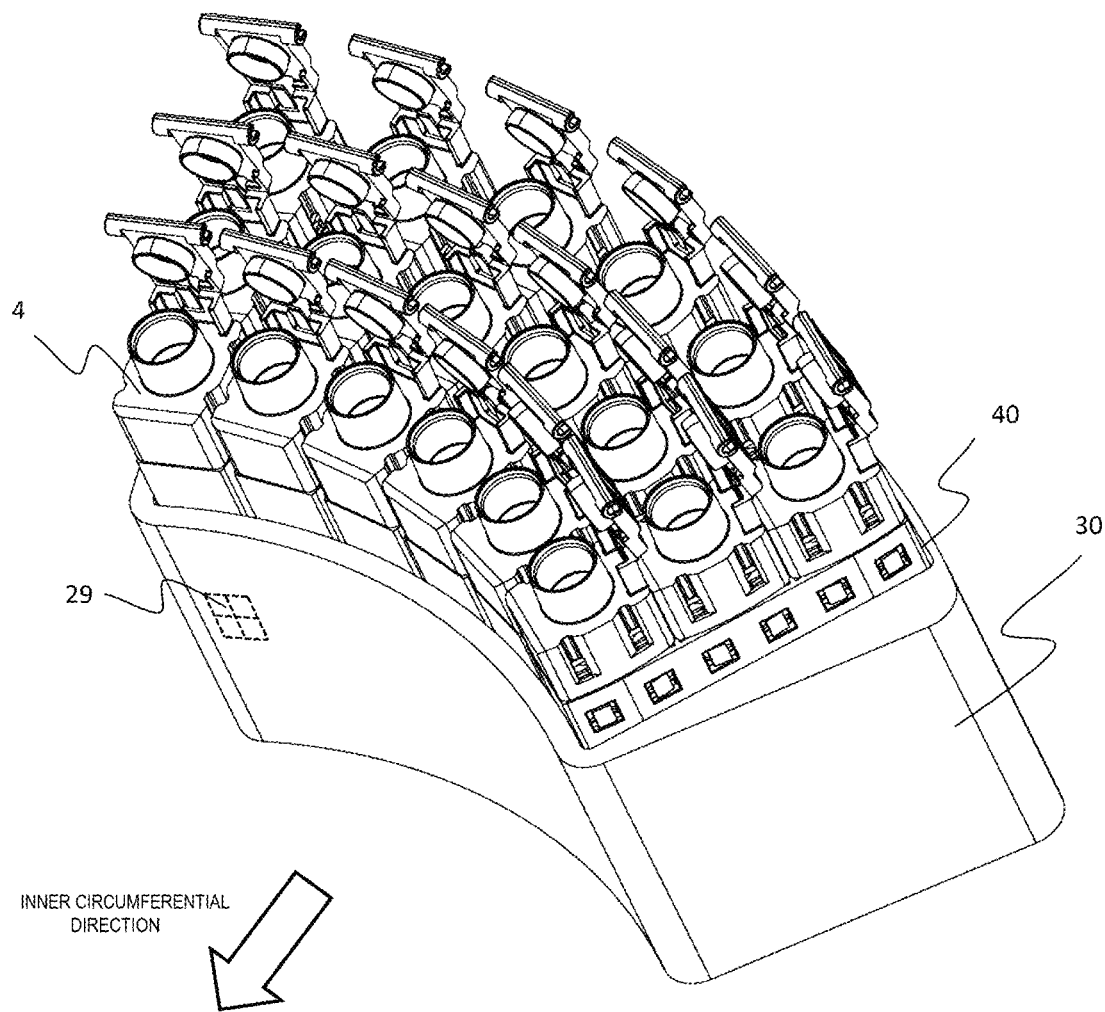

[FIG. 6]
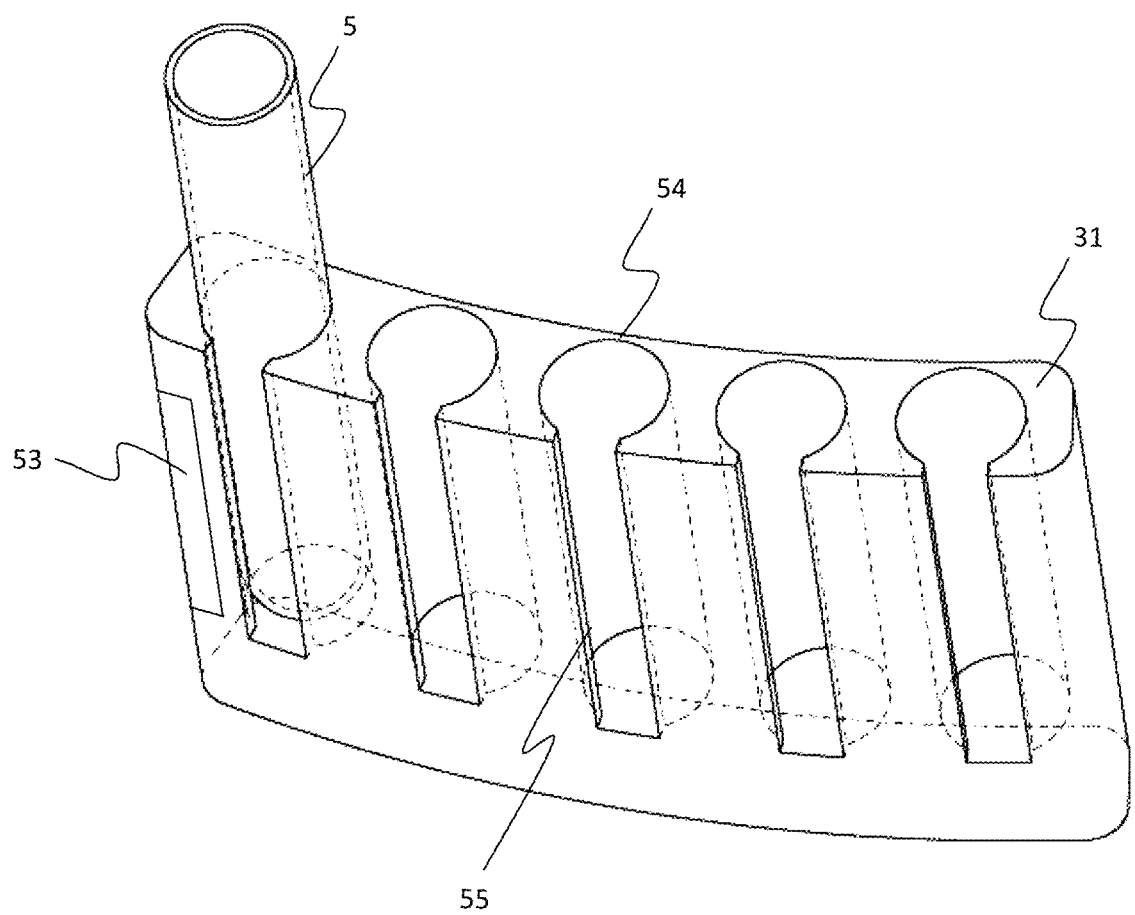

[FIG. 7]

| | |
|---|---|
| (1) WHEN IT IS DETERMINED THAT REAGENT BOTTLE IS INSTALLED IN NORMAL DIRECTION | |
| 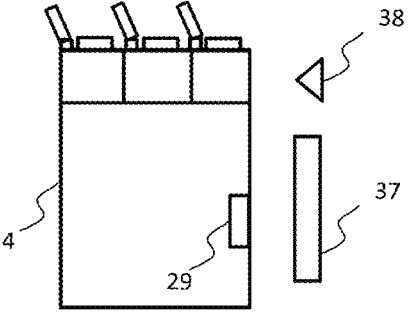 | PRESENCE OR ABSENCE OF REAGENT BOTTLE: YES<br><br>IC TAG READING AND WRITING: ENABLED |
| (2) WHEN IT IS DETERMINED THAT REAGENT BOTTLE IS INSTALLED IN REVERSE DIRECTION | |
| 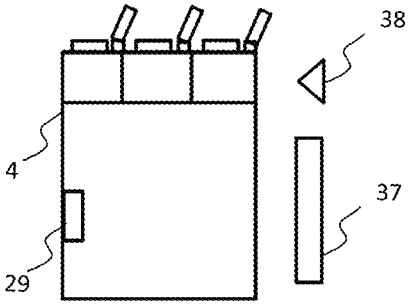 | PRESENCE OR ABSENCE OF REAGENT BOTTLE: YES<br><br>IC TAG READING AND WRITING: DISABLED |
| (3) WHEN IT IS DETERMINED THAT REAGENT BOTTLE IS NOT INSTALLED | |
| 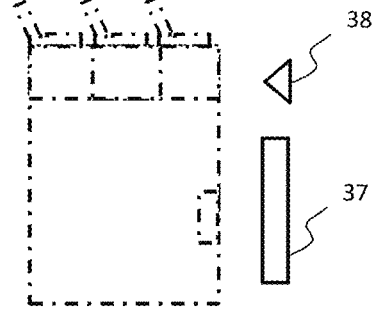 | PRESENCE OR ABSENCE OF REAGENT BOTTLE: NO<br><br>IC TAG READING AND WRITING: DISABLED |

[FIG. 8A]
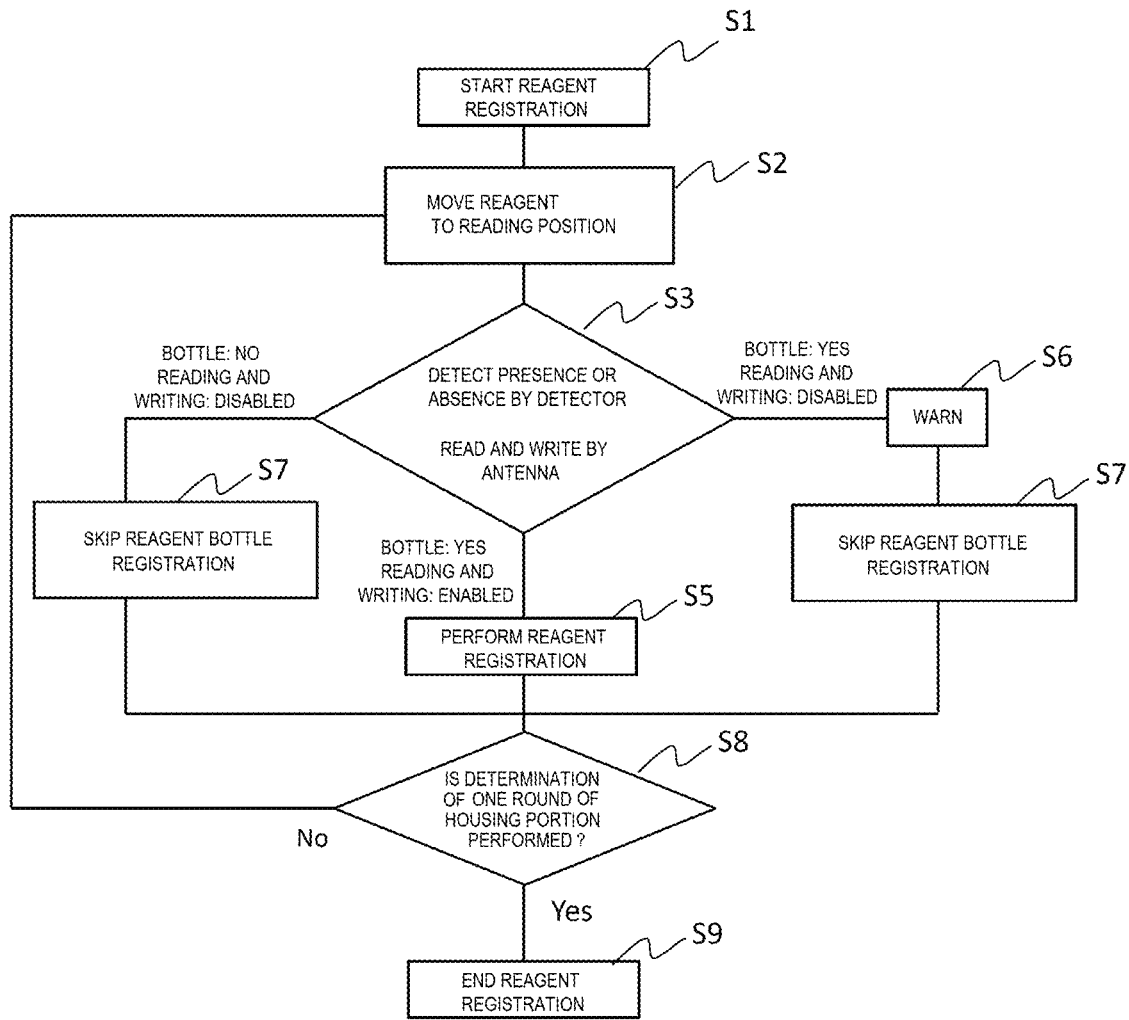

[FIG. 8B]
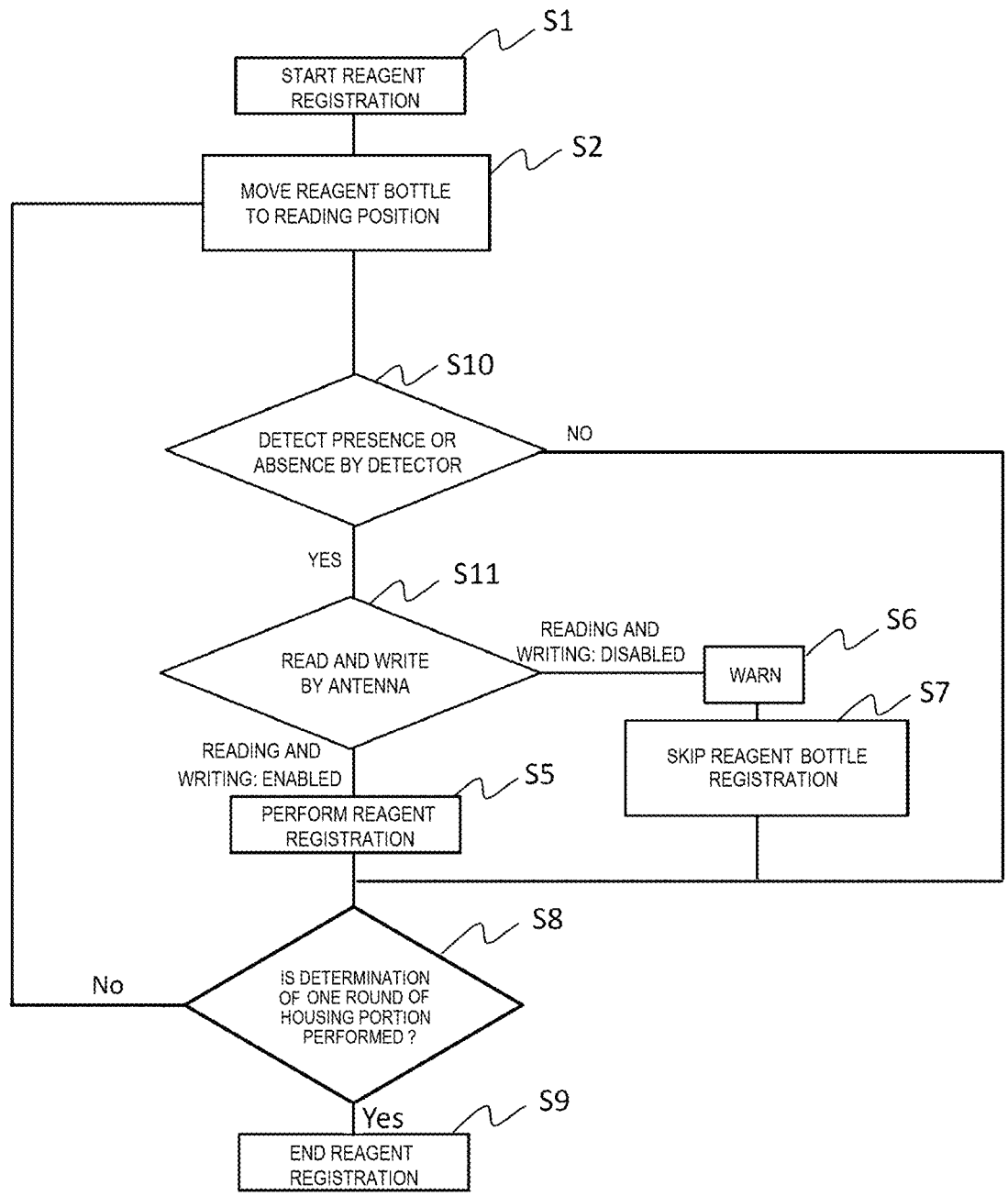

AUTOMATIC ANALYZER

TECHNICAL FIELD

The present invention relates to an automatic analyzer.

BACKGROUND ART

In an automatic analyzer that performs the analysis of a biological sample (sample) such as blood and urine, a reagent reacting to an analysis target component in the sample is added to the sample and mixed with the sample for analysis. Nowadays, with the development of pharmaceutical techniques, reagents capable of analyzing many types of analysis targets are commercially available. Therefore, in automatic analyzers using many types of reagents, a mainstream automatic analyzer includes a mechanism that attaches an identification ID such as a barcode or an IC tag (RFID) to a reagent bottle and the analyzer automatically identifies a type of reagent so as not to report a faulty analysis result due to a mix-up between reagents.

Patent Literature 1 discloses that the insertion direction of a reagent bottle is identified at a place where a reagent container is inserted and in the case in which the inserting direction is the reverse direction, an actuator corrects the inserting direction to insert the reagent bottle into a reagent disk. As a sensor that detects the inserting direction, a reflective sensor or a tag is exemplified.

In Patent Literature 2, IC tag is attached to the top surface of a reagent bottle. In Patent Literature 2, a reader antenna for an IC tag is provided such that in the case in which the reagent bottle is installed in a positive direction, the antenna of the tag is located in a region in which the reader antenna is capable of establishing communication, whereas in the case in which the reagent bottle is installed in the reverse direction, the antenna of the tag is located out of the region in which the reader antenna is capable of establishing communication, and thus the direction of the reagent bottle is determined based on whether communication with the IC tag is enabled.

CITATION LIST

Patent Literature

Patent Literature 1: Japanese Unexamined Patent Application Publication No. 2013-134145
Patent Literature 2: Japanese Unexamined Patent Application Publication No. 2011-27658

SUMMARY OF INVENTION

Technical Problem

In the case in which the shape of the reagent bottle is in a rectangular parallelepiped shape in bilateral symmetry, the reagent bottle is possibly installed into the reagent bottle holding portion of the automatic analyzer in the reverse direction, not in the normal direction. When the reagent bottle is installed in the faulty direction for analysis, different reagents are generally housed in reagent containers on the reagent bottle, and correct analysis results fail to be obtained. Nowadays, in order to manage reagent information on the reagent bottle, attaching an IC tag to the reagent bottle is generally performed. Patent Literature 1 and Patent Literature 2 described above are citation literatures that determine the direction of the reagent bottle utilizing the fact that the IC tag is capable of establishing communication only in the case in which the IC tag is placed at a close distance to the antenna.

In Patent Literature 1, since the inserting direction is determined at a place where the reagent container is inserted, and the inserting direction is corrected to the correct direction, and thus the insertion of the reagent bottle is enabled in the correct direction. However, the overhead to insert the reagent bottle is large, leading to a concern that working efficiency is degraded in the case in which the simultaneous insertion of a plurality of reagent bottles is desired, for example. On the other hand, in Patent Literature 2, in the case in which establishing communication with the IC tag fails, in order to determine whether the reagent bottle is installed in the faulty direction or no reagent bottle is installed, the reagent bottle holding portion is rotated to again confirm whether establishing communication is enabled, and the liquid level is further detected using a reagent probe to determine the presence or absence of the reagent bottle and the direction of the reagent bottle installed. Therefore, in Patent Literature 2, the attachment position of the IC tag to the reagent bottle is restricted, and shortening the overhead to confirm the installed situations of the reagent bottle in the reagent bottle holding portion is difficult, leading to a concern that these confirmation and determination may be obstacles against the improvement of test throughput.

An object of the present invention is to provide an automatic analyzer that is capable of quickly replacing a reagent bottle while the reverse placement of the reagent bottle is prevented.

Solution to Problem

An automatic analyzer, which is an embodiment of the present invention, includes a housing unit which is capable of housing a plurality of reagent bottles each of which is formed in a rectangular parallelepiped shape and has an IC tag on one surface of short-side side surfaces of the reagent bottle, an antenna which is used to communicate with the IC tag, a detector which detects the presence or absence of the reagent bottles, and a control unit. The housing unit includes a housing container which is cooled by a cooling machine, a heat insulating material which covers a periphery of the housing container, a reagent tray which is provided with a plurality of reagent bottle holding portions holding the reagent bottles, a disk which rotatably holds the reagent tray, and a driving unit which drives the disk. When it is unable to communicate with the IC tag of a first reagent bottle installed in the reagent bottle holding portion where a reagent bottle is detected by the detector, the control unit determines that the first reagent bottle is installed in a reverse direction.

Advantageous Effects of Invention

There is provide an automatic analyzer that is capable of quickly replacing a reagent bottle while the reverse placement of the reagent bottle is prevented.

The other problems and novel features will be apparent from the description and the accompanying drawings of the present specification.

BRIEF DESCRIPTION OF DRAWINGS

FIG. 1 is an overall schematic configuration diagram of an automatic analyzer.

FIG. 2 is a schematic perspective view of a reagent and sample common housing unit.

FIG. 3 is a top view and a cross-sectional view of an interior of the reagent and sample common housing unit.

FIG. 4 is a view showing the shape of a reagent bottle.

FIG. 5A is a schematic perspective view of a reagent tray.

FIG. 5B is a schematic perspective view of the reagent tray.

FIG. 6 is a schematic perspective view of a sample rack.

FIG. 7 is a view showing a determination scheme detecting the presence or absence of a reagent bottle and a direction of the installation of the reagent bottle.

FIG. 8A is a flowchart determining reverse placement of the reagent bottle.

FIG. 8B is a flowchart determining reverse placement of the reagent bottle.

DESCRIPTION OF EMBODIMENTS

In the following, an embodiment of the present invention will be described with refine to the drawings.

FIG. 1 schematically shows the overall structure of an automatic analyzer. In FIG. 1, on the outer circumference of an incubator 1, reaction containers 2 are arranged. The reaction container 2 is shared in all reactions, and is disposable. The reaction container 2 is stored on a reaction container tray 20, and supplied to the incubator 1 by a dispensing tip/reaction container conveying mechanism 17. The incubator 1 is controlled so as to rotate and drive in distances corresponding to a predetermined number of reaction containers at one cycle by a driving mechanism such as a motor.

On a reagent and sample common housing unit 3, a plurality of reagent bottles 4 and a plurality of sample containers 5 are placeable. In this example, the reagent bottle 4 is located on the inner circumference of the sample container 5. However, the sample container 5 may be located on the inner circumference of the reagent bottle 4, or the reagent bottle 4 and the sample container 5 may be configured being separately located from each other in the circumferential direction, not in the radial direction.

Between the incubator 1 and the reagent and sample common housing unit 3, a first dispensing mechanism 8 and a second dispensing mechanism 9 rotatable and vertically movable, and including a dispensing nozzle are disposed. To the dispensing nozzles, pumps 10 and 11 are respectively connected.

The first dispensing mechanism 8 and the second dispensing mechanism 9 are properly used in examinations in the process of different analysis. For example, when the first dispensing mechanism 8 is biological use, and the second dispensing mechanism 9 is immunological use, the first dispensing mechanism 8 dispenses samples and reagents for biological examinations, and the second dispensing mechanism 9 dispenses samples and reagents for immunological examinations. Note that in regard to samples subjected to both of the biological examination and the immunological examination, the first dispensing mechanism 8 makes access to the sample for dispensing in the biological examination, and the second dispensing mechanism 9 makes access to the sample for dispensing in the immunological examination. Note that since the second dispensing mechanism 9 for immunological use is highly required to prevent contamination between samples, a dispensing tip 18 is put on the dispensing nozzle in dispensing. The dispensing tip 18 is stored on a dispensing tip tray 19. The dispensing tip 18 is supplied to a dispensing tip installing position 22 by the dispensing tip/reaction container conveying mechanism 17, and put on the dispensing nozzle at the dispensing tip installing position 22.

The dispensing nozzle moves while drawing an arc about the rotation axis, and performs sample dispensing from the sample container to the reaction container. On the tracks of the dispensing nozzles, a reagent aspiration position 6 and a sample aspiration position 7 on the reagent and sample common housing unit 3, a first dispensing position and a second dispensing position on the incubator 1, and a cleaning tank 12 (13) that cleans the dispensing nozzles are present. Since the second dispensing mechanism 9 uses the dispensing tip, in addition to these components, a dispensing tip installing position 22 and a dispensing tip disposal position 23 are also present on the track. The first dispensing mechanism 8 and the second dispensing mechanism 9 are disposed such that the tracks of the dispensing nozzles do not physically interfere with each other and the mechanisms do not physically interfere with each other.

In performing the biological examination, a sample and a reagent are aspirated using the dispensing nozzle, and in the immunological examination, a sample and a reagent are aspirated using the dispensing tip put on the dispensing nozzle. The sample and the reagent are stirred and mixed in the reaction container 2 by aspiration and discharge operations with the dispensing nozzle or the dispensing tip. The reaction container 2 that houses a reaction solution having the sample and the reagent mixed is managed at a predetermined temperature by the incubator 1 for promoting reactions for a predetermined period of time.

In the periphery of the incubator 1, a spectrophotometer 15 for biological examinations is disposed. The spectrophotometer 15 includes a light source or a detector, not shown. The spectrophotometer 15 separates a transmitted light beam into spectral components, the light beam being obtained by the application of the light source to the reaction solution having the sample and the reagent mixed, and detects the components to measure the absorbances of the reaction solution.

The reaction solution reacted for a predetermined period of time by the incubator 1 is measured by a detection mechanism 16 for immunological examinations. In the immunological examination, as method for detecting a labeling substance, there are methods using the principle of electrochemiluminescence or chemiluminescence in which second liquids or labeling substances, and the structure and physical properties of detection regions suited to these methods are selected, and the emission light quantity derived from the luminous reaction of the labeling substance is measured using a photomultiplier tube as a detector.

In the biological examination, the reaction container 2 with the measurement of the absorbance completed by the incubator 1 is discarded into a dispensing tip/reaction container disposal box 21 by the dispensing tip/reaction container conveying mechanism 17. In the immunological examination, the dispensing tip/reaction container conveying mechanism 17 also performs moving the reaction container 2 containing the reaction solution reacted for a predetermined period of time by the incubator 1 to the detection mechanism 16 and moving the reaction container 2 with measurement completed at the detection mechanism 16 to the dispensing tip/reaction container disposal box 21.

The mechanisms of the automatic analyzer are connected to a control unit 28. The control unit 28 controls various mechanisms for rotation and drive of the incubator, the rotational operation of the inside of the reagent and sample common housing unit, the drive, sample aspiration, and sample discharge operations of the sample nozzle, and other operations. Note that for simplicity of the drawings, in FIG. 1, the connections of the mechanisms constituting the automatic analyzer to the control unit are omitted.

Next, the configuration of the reagent and sample common housing unit 3 will be described. FIG. 2 is a schematic perspective view of the reagent and sample common housing unit 3. On the top surface of the reagent and sample common housing unit 3, a lid 39 is included for preventing contamination to reagents and samples and for thermal insulation. The lid 39 is provided with holes, to which the dispensing mechanisms or the reagent stirring mechanism make access, at the reagent aspiration position 6 at which the first dispensing mechanism 8 and the second dispensing mechanism 9 aspirate reagents (in this example, three portions matched with the opening of the reagent bottle), the sample aspiration position 7 at which a sample is aspirated, and a reagent stirring mechanism access position 48 at which a reagent stirring mechanism 14 stirs a reagent. An ejection port 50 is included to put in and take out of a reagent tray 30 that retains the reagent bottle 4 and a sample rack 31 on which the sample is installed from the reagent and sample common housing unit 3. At the ejection port 50, an opening and closing lid 51 is provided. On the side surface of the reagent and sample common housing unit 3, a barcode read window 49 is included to rad a barcode attached to the sample rack 31 and the sample container 5.

FIG. 3 shows a top view showing the inside of the reagent and sample common housing unit 3 and a cross sectional view taken along line A-A shown in the top view of the inside. This example has a layout in which the reagent bottles 4 are arranged on the inner circumference of the reagent and sample common housing unit 3 and the sample containers 5 are arranged on the outer circumference. The reagent and sample common housing unit 3 includes the reagent tray 30 holding a plurality of the reagent bottles 4 and the sample rack 31 holding a plurality of the sample containers 5, and the reagent tray 30 and the sample rack 31 are installed on a reagent and sample disk 32 having a function of fixing the reagent tray 30 and the sample rack 31. The reagent and sample disk 32 is in the inside of the housing container 33, and the periphery of the housing container 33 is covered with the heat insulating material 34, and thus this enables thermal insulation in the inside of the housing container 33 cooled by the cooling machine 35. In the center part of the housing container 33, a cylindrical portion is present, and in the inside of the cylindrical portion, a drive unit 36 that rotationally moves the reagent and sample disk 32 to the target position, an antenna 37 that reads an IC tag 29 and information attached to the reagent bottle 4 or writes information, and a detector 38 that determines the presence or absence of the reagent bottle 4 are included. The antenna 37 is disposed such that in the case in which the reagent bottle 4 is installed in the normal direction, the antenna 37 enables reading and writing whereas in the case in which the reagent bottle 4 is installed in the reverse direction, the antenna 37 is placed at the position out of the range of reading the IC tag 29. The antenna 37 and the detector 38 are provided at one place in the inside of the cylindrical portion. Here, the antenna 37 and the detector 38 are provided on line A-A. However, the antenna 37 and the detector 38 are provided at given places in the inside of the cylindrical portion. The antenna 37 and the detector 38 are provided inside the heat insulating material 34, and thus the presence of the antenna 37 and the detector 38 cause no failure in low-temperature insulation in the housing container 33. The detector 38 has a laser light source and a photodetector, for example. The detector 38 applies laser light from the laser light source to a predetermined reagent bottle holding portion, and detects the presence or absence of a reagent bottle based on the presence or absence of the laser light having been reflected. Therefore, a window through which laser light passes ash to be provided on a part of the housing container 33. The removals of the heat insulating material 34 on the part for the window might cause a possibility of forming condensation on the window due to the temperature difference between the inside and outside of the housing container 33 or might cause a possibility of increasing fluctuations in the temperature in the vicinity of the window. The detector 38 is provided inside the heat insulating material 34, and thus avoidance of such a side effect is enabled. In the region close to the reagent bottle, the control unit 28 is connected to a memory holding portion 52, and the memory holding portion 52 holds reagent information from the IC tag 29 on the reagent bottle 4. The reagent information includes, for example, information such as the content of the reagent, the ID that uniquely identifies a reagent bottle, and the use situations of the reagent in the reagent bottle.

FIG. 4 shows the shape of the reagent bottle 4 installed on the reagent and sample common housing unit 3. In the drawing, the lid of the reagent bottle is in the opened state. The reagent bottle 4 has a nearly rectangular parallelepiped shape integrally formed of a plurality (e.g. three) of reagent containers 41, 42, and 43. On the top surfaces of the reagent containers 41, 42, and 43, an opening through which access is made to a reagent in each of the containers is provided, the opening protruding upward, and a reagent container lid 44 is provided to prevent contamination or evaporation of the reagent. The reagent containers 41, 42, and 43 enable housing different liquid solutions. One surface of the short-side side surface of the reagent bottle 4, the IC tag 29 that manages reagent information is included.

FIGS. 5A and 5B show schematic perspective views of the configuration of the reagent tray 30. FIG. 5A shows the reagent tray 30 that is empty, and FIG. 5B shows the reagent tray 30 holding the reagent bottles. In the state in which the reagent tray 30 is accommodated in the reagent and sample common housing unit 3, the lid of the reagent bottle is in the opened state. As shown in FIG. 5A, the reagent tray 30 includes a plurality of reagent bottles holding portions 40. As shown in FIG. 5B, the state in which the reagent tray 30 is installed such that the side surface on which the IC tag 29 on the reagent bottle 4 is attached is directed to the inner circumferential direction of the reagent and sample common housing unit 3 is the normal direction. Here, since the reagent bottle holding portion 40 is in a rectangular parallelepiped shape matched with the shape of the reagent bottle 4, the reagent bottle 4 can be installed in the reagent bottle holding portion 40 in the normal direction and also in the reverse direction.

FIG. 6 shows is a schematic perspective view of the sample rack 31 in the state in which the sample container 5 is installed. The sample rack 31 includes a plurality of sample holding portions 54 that hold sample containers. On the sample holding portion 54, a groove 55 is cut such that a barcode (not shown) attached to the sample container 5 can be read by a barcode reader present on the outer circumference of the reagent and sample common housing unit 3. Also on the sample rack 31, a rack barcode 53 is attached in order to identify a plurality of sample racks installed in the inside of the reagent and sample common housing unit 3.

FIG. 7 shows a determination scheme that detects the presence or absence of installation of the reagent bottle and the direction of the reagent bottle in the present embodiment. The reagent bottle 4 installed in the inside of the reagent and sample common housing unit 3 is transported to the position opposite to the detector 38 and the antenna 37 by the drive unit 36. The control unit 28 detects the presence or absence of the reagent bottle 4 using the detector 38, and determines whether the direction of installing the reagent bottle 4 is normal using the antenna 37. The direction of installing the reagent bottle 4 is determined whether information on the IC tag 29 attached to the reagent bottle 4 can be read and written normally. Note that although determination is desirably made whether the control unit 28 can normally establish the read and write necessary to manage the reagent bottle 4 with the IC tag 29, the determination whether the installation direction is normal is made sufficiently based on whether information on the IC tag 29 can be read alone.

In the case in which the detector 38 determines that the reagent bottle is present and information is normally read from and written on the IC tag 29, it can be determined that the reagent bottle 4 is installed in the normal direction (the case in (1) in FIG. 7). Contrastingly, when the reagent bottle 4 is installed in the reverse direction, the IC tag 29 is out of the reading range of the antenna 37 to fail to read and write information, and thus it can be determined that the reagent bottle 4 is installed in the reverse direction (the case in (2) in FIG. 7). In this case, a warning is displayed on a display or an indicating light such as an LED, or an operator is informed by audio or an alarm, and thus this enables the prevention of an abnormality of an analysis result due to the reverse placement of the reagent bottle. In the case in which the detector 38 is determined that no reagent bottle is present and no information is read from and written on the IC tag 29, it can be determined that the reagent bottle 4 is not installed (the case in (3) in FIG. 7).

FIGS. 8A and 8B show flowcharts of the reagent registration operation of the reagent bottle 4 executed by the control unit 28. The present flowcharts are executed after the opening and closing lid 51 of the reagent and sample common housing unit 3 is opened. Since the automatic analyzer is not enabled to recognize what operation has been made on the reagent bottle stored while the opening and closing lid 51 is being opened, the reagent registration operation is executed on the reagent bottle housed in the reagent and sample common housing unit 3 every time when the opening and closing lid 51 is opened and closed. The determination of the reverse placement of the reagent bottle 4 is executed as a part of the reagent registration operation of the reagent bottle 4.

In FIG. 8A, upon the instruction of executing the registration of a reagent by the operator (S1), the drive unit 36 causes the reagent bottle 4 to move to the read position of the antenna 37 and the detector 38 (S2). The detection of the presence or absence of the reagent bottle by the detector 38 and the read and write by the antenna 37 are performed together (S3). As described above, reading the IC tag by the antenna 37 alone may be performed. At this time, in the case in which the reagent bottle is present and the IC tag 29 is readable and writable, the reagent registration operation is performed (S5). Contrastingly, in the case in which no reagent bottle is present and no read nor write is enabled, or in the case in which the reagent bottle is present and no read nor write is enabled to the IC tag, the registration operation of the reagent bottle is skipped (S7). In addition, in the case in which no read nor write is enabled to the IC tag 29 even though it is determined that the reagent bottle is present, the operator is informed of warning that there is a possibility of the reverse placement of the reagent bottle as described above (S6). The above determination is performed on one round of the reagent and sample common housing unit 3 (S8), and the registration of the reagent is completed (S9).

sine the antenna needs a few seconds to read and write the IC tag 29, there is a concern that performing the reverse placement determination on all the positions on the reagent and sample common housing unit 3 takes time for the registration of the reagent as shown in FIG. 8A.

FIG. 8B shows a determination flow that completes the registration of the reagent for shorter time. upon the instruction of executing the registration of a reagent by the operator (S1), the drive unit 36 causes the reagent bottle 4 to move to the read position of the antenna 37 and the detector 38 (S2). In the present flow, first, the detector 38 detects the presence or absence of a reagent bottle (S10). In the case in which the reagent bottle is present, read and write are performed by the antenna 37 (S11), whereas in the case in which no reagent bottle is present, the subsequent reagent bottle is moved to the read position by the drive unit 36 (S2). That is, depending on the detected result by the detector 38, the read and write operation to the IC tag 29 is skipped. In the case in which read and write to the IC tag 29 are possible, the reagent registration operation is performed (S5). Contrastingly, in the case in which no end nor write is enabled to the IC tag 29, the operator is informed of warning that there is a possibility of the reverse placement of the reagent bottle (S6), and the registration operation of the reagent bottle is skipped (S7). The determination above is performed on one round of the reagent and sample common housing unit 3 (S8), and the registration of the reagent is completed (S9).

As an exemplary modification of the present flow, the detection of the presence or absence of the reagent bottle by the detector 38 is performed on one round of the sample common housing unit, the memory holding portion 52 is caused to store the positions at which the reagent bottle is set, and then the reverse placement determination and the registration of the reagent are performed at the corresponding positions. This also effective in shortening time.

As described above, the embodiment is described. However, the present invention is not limited to the embodiment described above. For example, in the exemplified automatic analyzer, the sample container 5 installed on the sample rack 31 on the outer circumference in the inside of the reagent and sample common housing unit 3 is disposed, the IC tag 29 is attached to the short-side side surface of the reagent bottle 4, and thus the antenna 37 is disposed on the inner circumference side. The position at which the antenna 37 is disposed is changed according to a method of disposing the reagent bottle in the reagent and sample common housing unit 3. For example, in the case in which the region in which the reagent bottle 4 and the sample container 5 are accommodated is separated in the circumferential direction, not in the radial direction, it is also considered that the antenna 37 is disposed on the outer circumference of the housing unit. In this case, the normal direction in the installation of the reagent bottle 4 is the direction in which the antenna 37 disposed on the outer circumference faces the IC tag 29.

In the embodiment described above, the antenna 37 and the detector 38 are disposed along the vertical direction, i.e., the antenna 37 and the detector 38 are disposed facing the short-side side surface of the same reagent bottle. However, the detector 38 may be included on the lid 39 on the top surface of the reagent and sample common housing unit 3. At this time, desirably, the antenna 37 and the detector 38 are disposed such that the detector 38 detects the presence or absence of one reagent bottle and the antenna 37 reads and writes information without rotating the drive unit 36. In the case in which simultaneous performing the detection of the presence or absence by the detector 38 and reading and writing information by the antenna 37 is not enabled, the determined results have to be synchronized in order to match reagent bottles having been detected by the detector 38 with reagent bottles having made to access by the antenna 37.

REFERENCE SIGN LIST

1: incubator, 2: reaction container, 3: reagent and sample common housing unit, 4: reagent bottle, 5: sample container, 6: reagent aspiration position, 7: sample aspiration position, 8: first dispensing mechanism, 9: second dispensing mechanism, 10: pump for first dispensing mechanism, 11: pump for second dispensing mechanism, 12: cleaning tank for first dispensing nozzle, 13: cleaning tank for second dispensing nozzle, 14: reagent stirring mechanism, 15: spectrophotometer, 16: detection mechanism, 17: dispensing tip/reaction container conveying mechanism, 18: dispensing tip, 19: dispensing tip tray, 20: reaction container tray, 21: dispensing tip/reaction container disposal box, 22: dispensing tip installing position, 23: dispensing tip disposal position, 28: control unit, 29: IC tag, 30: reagent tray, 31: sample rack, 32: reagent and sample disk, 33: housing container, 34: heat insulating material, 35: cooling machine, 36: driving unit, 37: antenna, 38: detector, 39: lid, 40: reagent bottle holding portion, 41, 42, 43: reagent container, 44: reagent container lid, 53: rack bar code, 54: sample holding portion, 55: groove

The invention claimed is:

1. An automatic analyzer comprising:
    a housing unit which is capable of housing a plurality of rectangular parallelepiped reagent bottles, each reagent bottle having an integrated chip IC tag on one surface thereof;
    an antenna which is used to communicate with the integrated chip IC tag;
    a detector configured to detect the presence or absence of the reagent bottles; and
    a control unit programmed to execute a reagent registration operation on a reagent bottle housed in the housing unit every time when the housing unit is opened and closed, wherein
    the housing unit includes a housing container which is capable of being cooled by a cooling machine, a heat insulating material which covers a periphery of the housing container, a reagent tray which is provided with a plurality of reagent bottle holding portions holding the reagent bottles, a disk which rotatably holds the reagent tray, and a driving unit configured to drive the disk wherein the control unit is programmed such that in performing the reagent registration operation, when the detector detects a reagent bottle at a read position, the control unit performs a communication operation with the integrated chip IC tag of the reagent bottle installed in the reagent bottle holding portion located at the read position, and when no reagent bottle is detected, the control unit does not perform the communication operation, and
    when the control unit is unable to communicate with the IC integrated chip tag of a first reagent bottle installed in the reagent bottle holding portion where the reagent bottles can be detected by the detector, the control unit determines that the first reagent bottle is installed in a reverse direction.

2. The automatic analyzer according to claim 1, wherein the detector and the antenna are provided to face one of the reagent bottle holding portions.

3. The automatic analyzer according to claim 2, wherein
    the reagent bottle holding portion of the reagent tray has a shape in which a short-side side surface of the reagent bottle faces an inner circumference of the housing container, and
    the detector and the antenna are provided at a position facing the short-side side surface of the reagent bottle held by the reagent bottle holding portion.

4. The automatic analyzer according to claim 3, wherein
    the detector and the antenna are provided in the heat insulating material.

5. The automatic analyzer according to claim 1, wherein
    the reagent bottle is provided with a lid, and the lid of the reagent bottle is opened in a state where the reagent bottle is housed in the housing unit.

6. The automatic analyzer according to claim 3, wherein the housing unit includes a sample rack provided with a plurality of sample holding portions that hold a sample container, the disk is configured to rotatably hold the sample rack, and the sample rack is disposed on an outer circumferential side with respect to the reagent tray.

* * * * *